United States Patent [19]
Yang

[11] Patent Number: 5,101,078
[45] Date of Patent: Mar. 31, 1992

[54] FLOOR ELECTRIC WIRE JUNCTION CASE

[76] Inventor: Chin-Hui Yang, 4F., No. 2, Lane 409, Chung Cheng Rd., Hsin Tien City, Taipei, Taiwan

[21] Appl. No.: 488,820

[22] Filed: Feb. 26, 1990

[51] Int. Cl.⁵ .............................................. H02G 3/28
[52] U.S. Cl. .................................................... 174/48
[58] Field of Search ...................... 174/48, 49; 52/221

[56] References Cited

U.S. PATENT DOCUMENTS

| | | | |
|---|---|---|---|
| 2,930,504 | 3/1960 | Hudson | 174/48 |
| 3,318,476 | 5/1967 | Clark | 174/48 X |
| 3,956,573 | 5/1976 | Myers et al. | 174/48 |
| 4,443,654 | 4/1984 | Flachbarth et al. | 174/48 |
| 4,931,597 | 6/1990 | Kimbrough et al. | 174/48 |

Primary Examiner—Gerald P. Tolin
Assistant Examiner—David A. Tone
Attorney, Agent, or Firm—Varndell Legal Group

[57] ABSTRACT

A floor electric wire junction case includes a bottom block covered with a cover plate defining a plurality of wiring passages therebetween for respectively receiving a plurality of junctions which can be respectively connected to wiring connecting tubes. Each wiring bracket has a circular hole at its top for mounting a wiring plug assembly. The wiring plug assembly includes a movable ring plate permitting horizontal positioning of the wiring plug assembly in the associated wiring bracket.

4 Claims, 7 Drawing Sheets

5,101,078

FLOOR ELECTRIC WIRE JUNCTION CASE

BACKGROUND OF THE INVENTION

In building construction, piping work must be made in advance for further wiring installation before concreting. According to conventional method, electric wires are distributed behind the floor and wall surface. At a corner area or power outlet, a socket, bent pipe or manifold pipe is required for connection. In consequence, the installation of electric wires according to conventional method is complicated and time consuming. Further, according to the conventional wiring process, the electric wires tend to cause electric leakage due to erosion of water. Recently, electric wire junction cases are commonly used for wiring installation. Because the regular electric wire junction case is blocked up with a bolt, the threads of the bolt and the junction case tend to gather rust after being buried in concrete floor, and the bolt is then difficult to remove from the case for wiring installation. Further, the conventional electric wire junction case is expensive to manfacture, and the thread at each wiring hole of the case tends to be damaged during transportation.

It is therefore, the main object of the present invention to provide a floor electric wire junction case which is convenient and inexpensive to manfacture and which is generally comprised of a bottom block and a separate cover plate.

Another object of the present invention is to provide a floor electric wire junction case in which the positioning of junctions in the passages of the junction case is simply and effectively secured by screw bolts mounted on the cover plate of the junction case above the passages.

Still another object of the present invention is to provide a floor electric wire junction case having an insert to block of each passage of the junction case when no wiring is required.

Still another object of the present invention is to provide a floor electric wire junction case in which the connecting end of the junction used can be a circular or square tube according to the shape of the wire conduit used.

Still another object of the present invention is to provide a floor electric wire junction case which is easy to assembly for convenient wiring.

Still another object of the present invention is to provide a floor electric wire junction case in which the horizontal positioning of the movable ring plate of the wiring plug assembly is adjustable.

Still another object of the present invention is to provide a floor electric wire junction case in which an indicator plug is used to protect a wiring conduit passage from blocking up during the concreting process and to indicate the location for installation of a wiring plug assembly.

A yet further object of the present ivention is to provide a floor electric wire junction case in which the component parts of the wiring plug assembly is convenient to assemble through a screw connection.

DETAILED DESCRIPTION OF THE PREFERRED EMBODIMENT

Figure 1:
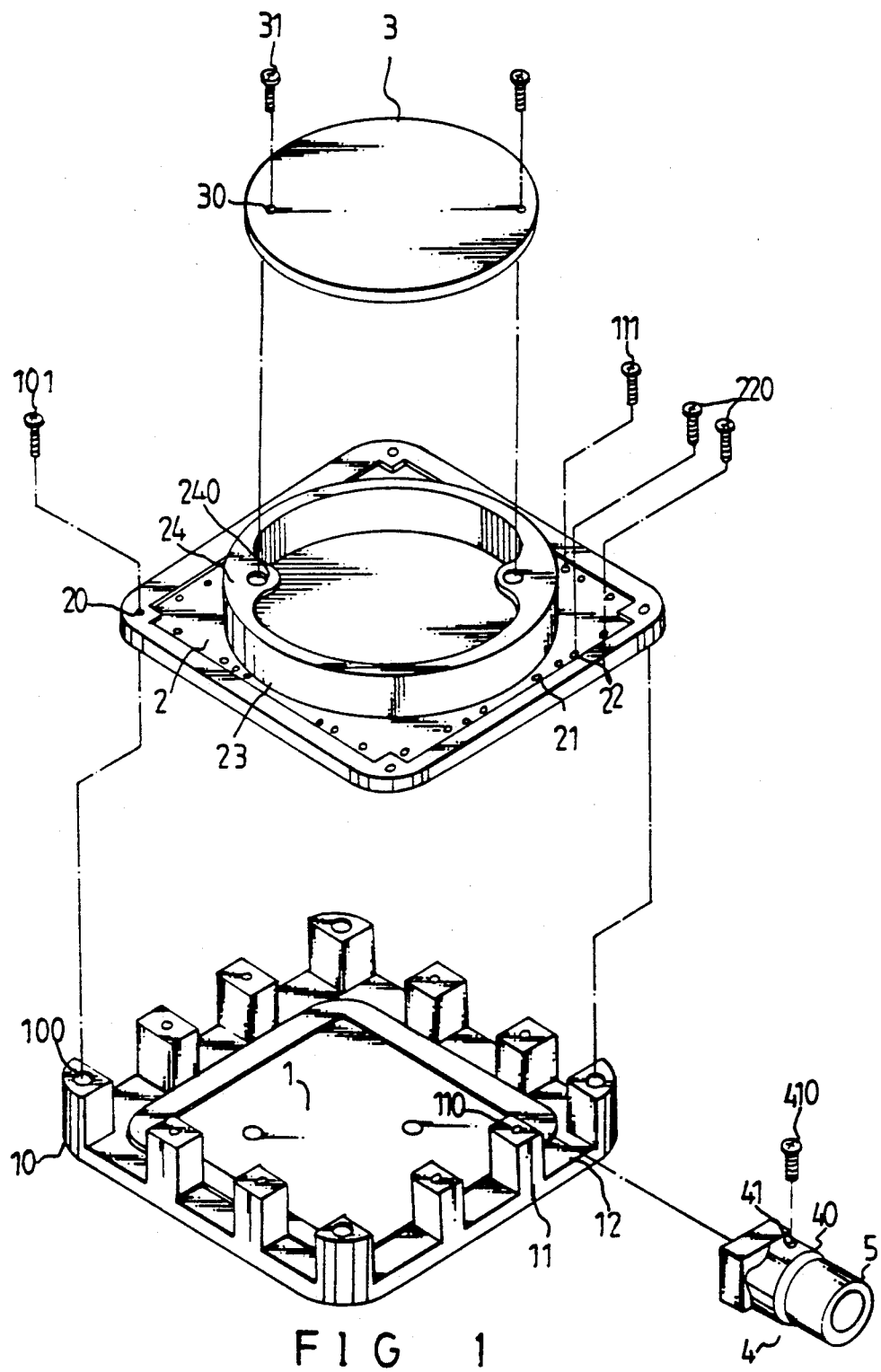
FIG. 1 is an exploded perspective view of a junction case embodying the present invention.
Figure 2:
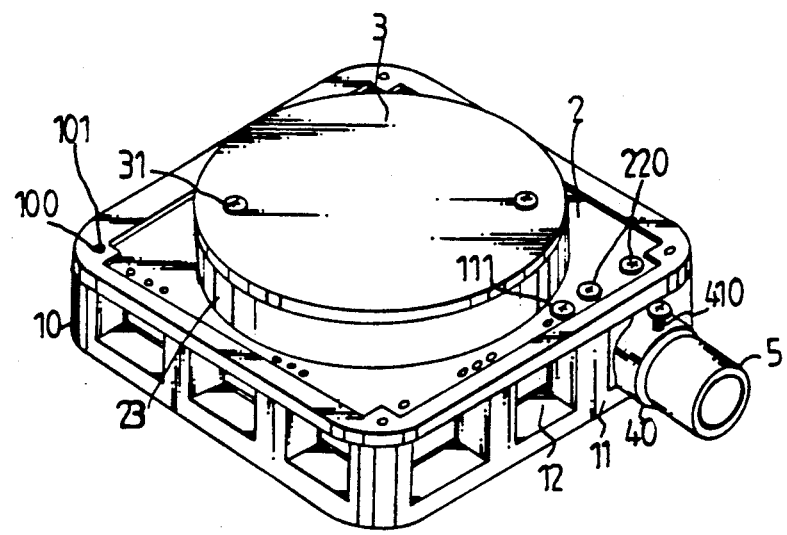
FIG. 2 is a perspective view of a portion of the present invention.

Turning now to the annexed drawings in detail and first referring to FIGS. 1 and 2, a floor electric wire junction case embodying the present invention is illustrated and generally comprised of a bottom block 1, a cover plate 2, a cap 3, and a plurality of junctions 4.

The bottom block 1 comprises four sector posts 10 upstanding therefrom at the four corners and a plurality of square posts 11 upstanding therefrom around the periphery among the sector posts 10. The sector posts and the square posts define therebetween a plurality of passages 12 for setting therein of a plurality of junctions 4 respectively. The sector posts 10 and the square posts 11 each comprises a bolt hole 100 or 110 at the top. The cover plate 2 comprises four round holes 20 at the four corner to match with the four holes 100 of the four sector posts, and a plurality of round holes 21 around the periphery to respectively match with the blot holes 110 of the square posts 11. During assembly, the cover plate 2 is mounted on the bottom block 1 and screw bolts 101 and 111 are respectively inserted through the corner round holes 20 and the side round holes 21 into the bolt holes 100 of the sector posts 10 and the bolt holes 110 of the square posts 11 to firmly secure the cover plate 2 to the bottom block 1. The cover plate 2 includes a pair of bolt holes 22 at both sides of each round hole 21 above each passage 12, such that screw bolts 220 may be inserted therethrough to press on the junctions 4 set therebelow so that the junctions are held firmly positioned. Each junction 4 includes a collar 40 having a bolt hole 41 made thereon for insertion therethrough of a screw bolt 410 for holding a wiring plug connecting tube 5 in the collar 40 by the tightening thereof. The cover plate 2 also comprises a flange 23 in its center defining therein a center hole. The flange 23 comprises a pair of symmetrical lugs 24 each having a bolt hole 240 made thereon to respectively match with the two round holes 30 of the cap 3 such that two screw bolts 31 may be inserted through the round holes 30 into the bolt holes 240 to secure the cap 3 to the cover plate 2.

Figure 3:
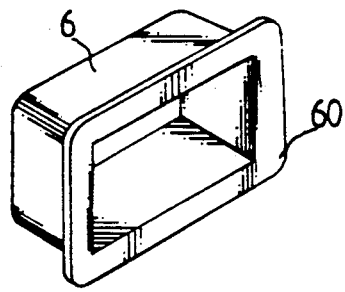
FIG. 3 is a perspective view of an insert according to the present invention.
Figure 4:
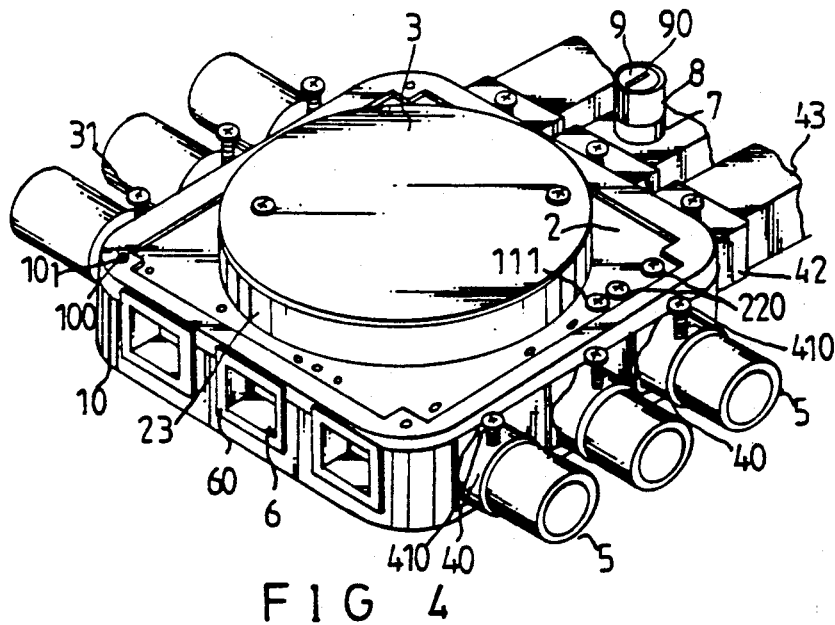
FIG. 4 is a perspective view illustrating the positioning of a wiring plug assembly and an insert in a junction case of the present invention.
Figure 5:
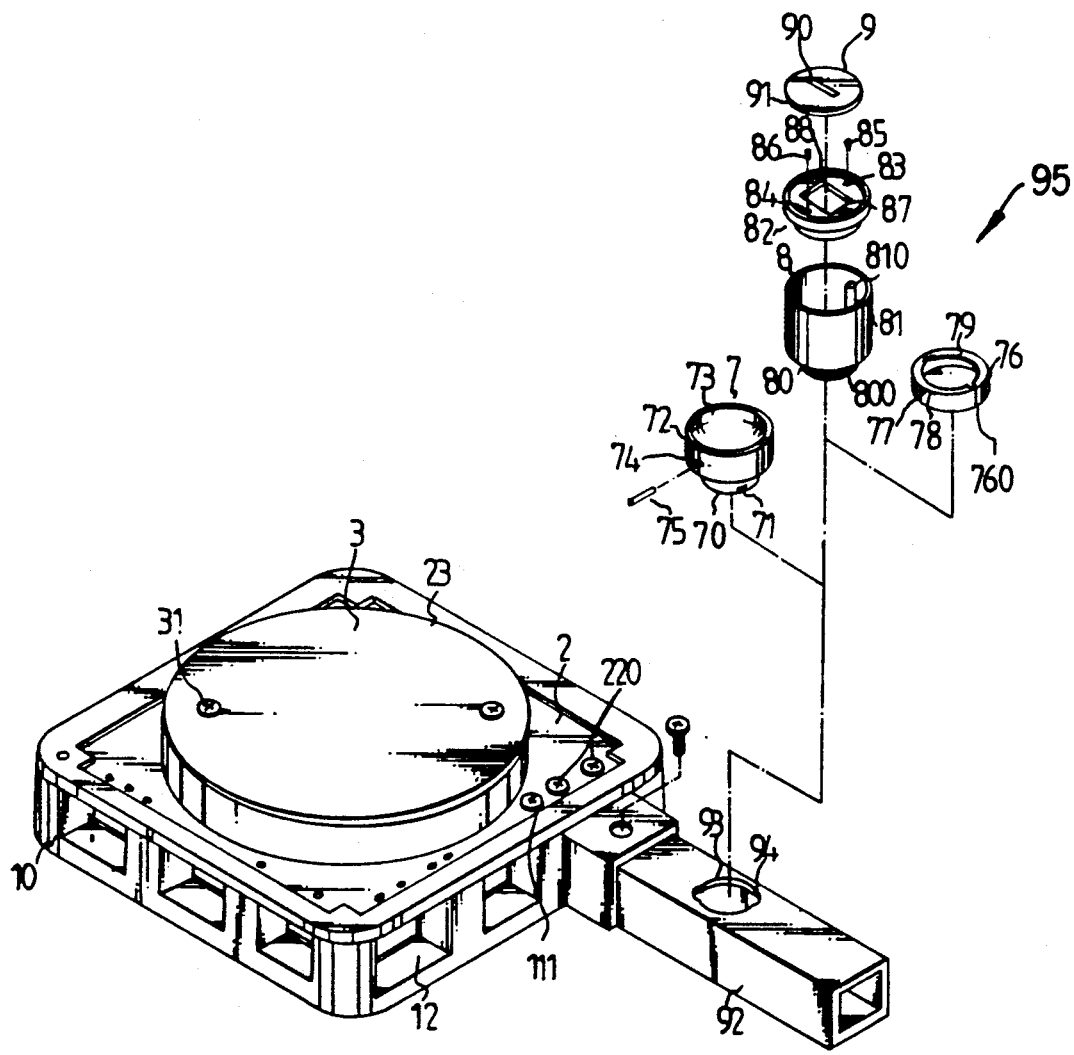
FIG. 5 is an exploded perspective view of the present invention illustrating the mnounting of a wiring plug assembly.

Referring to FIGS. 3 through 5, a wiring plug assembly 95 is mounted on a tubular bracket 92 inserted in the collar 40 of a junction 4 received in a passage 12 of the junction case. When no wiring is required in any passage 12, the pair of screw bolts 220 above the passage 12 may be loosened so that the junction 4 set therein can be removed. As a replacement, an insert 6 is inserted in the passage 12 and the pair of screw bolts 220 thereabove are screwed tight to secure the insert 6 to block up the passage 12. As illustrated in FIG. 3, an insert 6 comprises a flange 60 at one end thereof. When an insert 6 is inserted in a passage 12, the flange 60 is stopped at the front wall around the passage 12 to completely block up the way. As an alternate form of the collar 40, junction may respectively comprise a square tube 42 for connection thereto of a square plug connecting tube 43 (see FIG. 4). Because the bottom block 1 and the cover plate 2 are not unitarily made through shape molding process, they are more convenient and inexpensive to manufacture.

Figure 6:
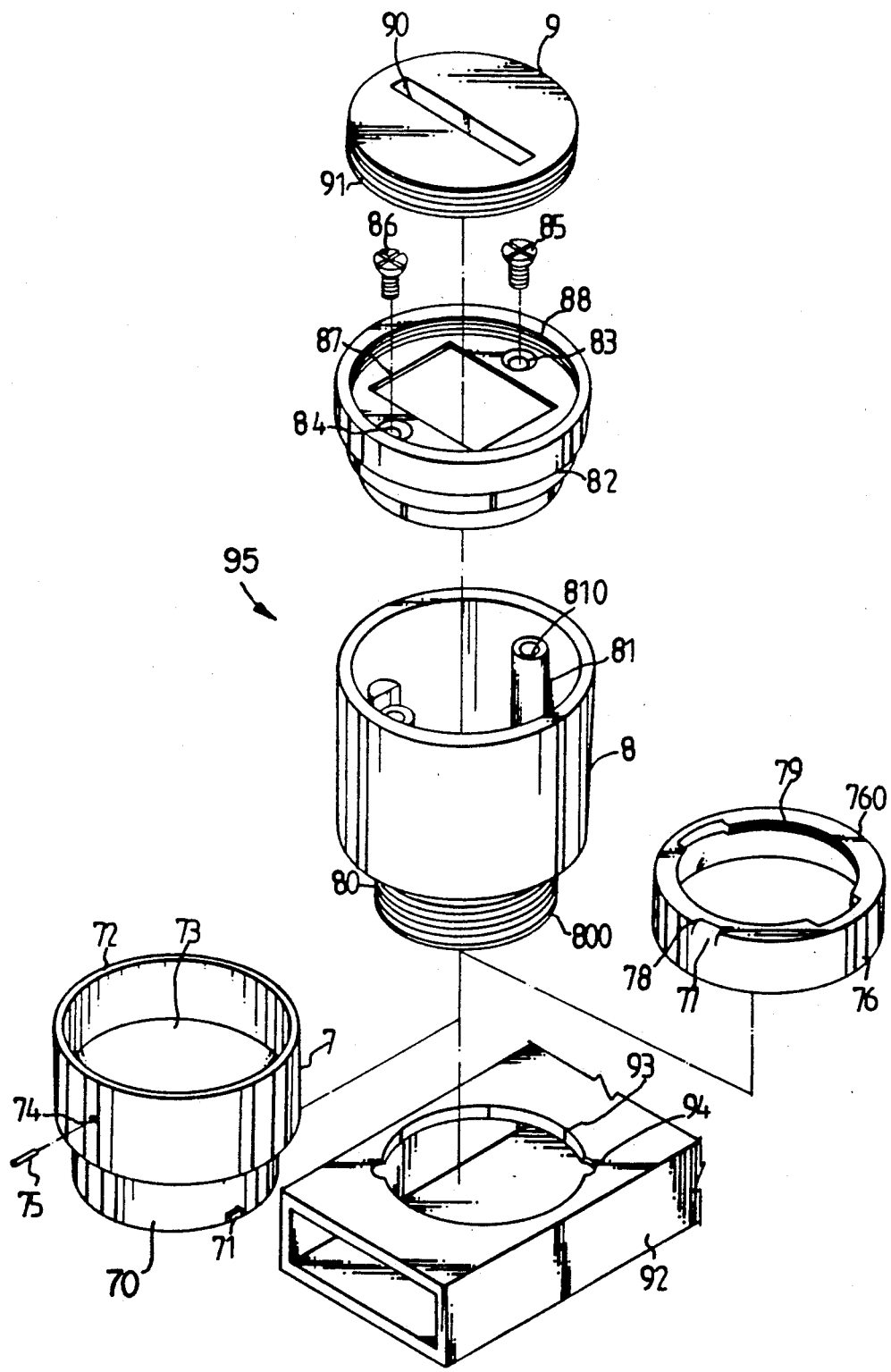
FIG. 6 is an exploded perspective view of a wiring plug assembly according to the present invention.
Figure 7:
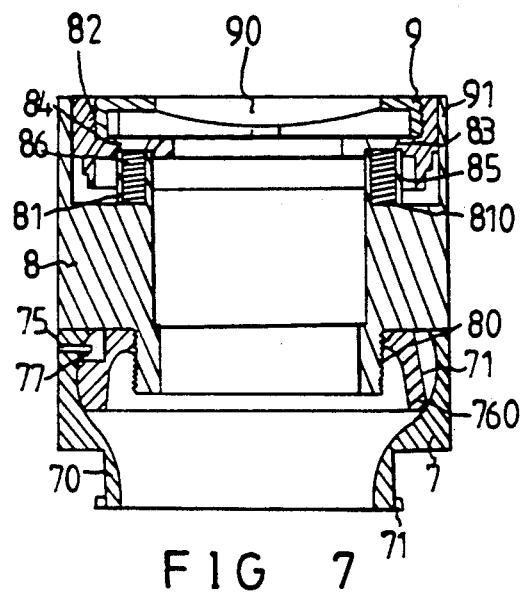
FIG. 7 is a sectional view of a wiring plug assembly according to the present invention.
Figure 8:
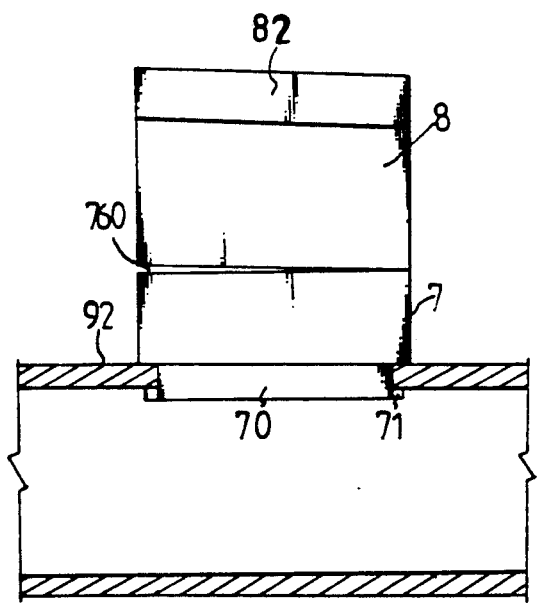
FIG. 8 is a sectional view of a wiring plug assembly according to the present invention.

Referring to FIGS. 6 through 8, a wiring plug assembly 95 is generally comprised of a tubular bracket 92, a connector 7, a ring plate 760, an intermediate socket 8, an upper socket 82 and a cap 9. The tubular bracket 92 includes a circular opening 93 at the top having made thereon a pair of opposite notches 94. The connector is mounted on the tubular bracket 92 in the circular opening 93, and is a stepped tube defining therein a curved inner wall 73. It includes a bottom cylinder 70 having made thereon a pair of rasied portions 71 to match with the pair of opposite notches 94 of the tubular bracket 92 for connection, and an upper cylinder 72 having made thereon a through-hole 74 for insertion therein of a pin 75 to secure the ring plate 760 therein. The ring plate 760 is a conical ring having narrower diameter at the top and wider diamether at the bottom, comprising an internal thread 79 for screw connection with the intermediate socket 8, and a notch 77 on the outer wall surface 76. When the ring plate 760 is inserted in the curved inner wall 73, the pin 75 which inserted through the through-hole 74 is seated in the notch 77 to stop aganist the two side edges 78 of the notch 77, such that the ring plate 760 is protected from rotating. The intermediate socket 8 includes a smaller bottom cylinder 80 having an external thread 800 made thereon for screw connection with the internal thread 79 of the ring plate 760, and a pair of circular pillars 81 which are attached to the inner wall surface opposite to each other, each comprising a bolt hole 810 on the top. The upper socket 82 is a solid pipe fitting mounted on the intermediate socket 8 at the top and comprises an internal thread 88 for screw connection with the cap 9, a rectangular hole 87 for connection thereto of an electric socket during the wiring process, and a pair of opposite bevel holes 83 and 84 for insertion therethrough of a pair of screw bolts 85 and 86 to screw up with the bolt holes 810 of the two circular pillars 81 to further secure the upper socket 82 to the intermediate socket 8. The cap 9 includes an external thread 91 for screw connection with the internal thread 88 of the upper socket 82 to block up the wiring plug assembly, and an elongated slot 90 on the top through which a tool may be used to remove the cap from the upper socket 82 for electric wiring.

Figure 9:
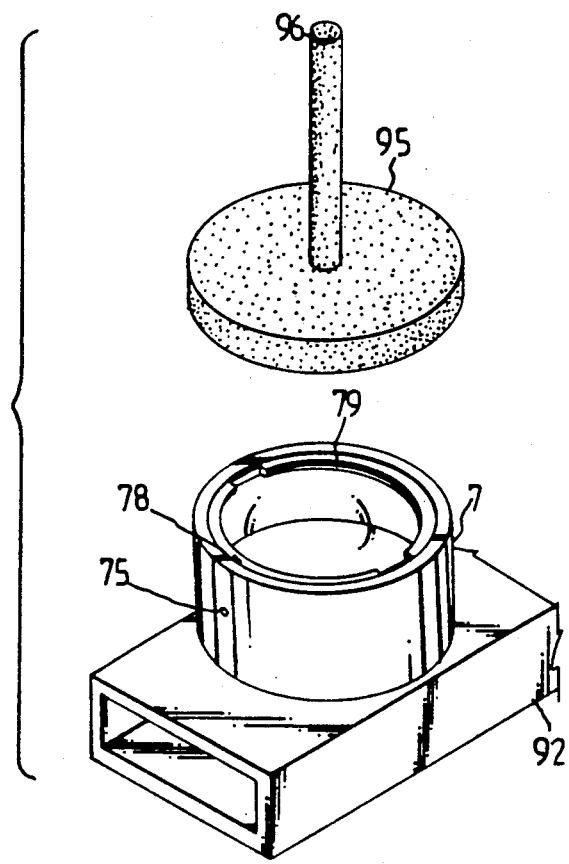
FIG. 9 is an exploded perspective view illustrating the use of an indicator plug mounting on the connector of a wiring plug assembly.
Figure 10:
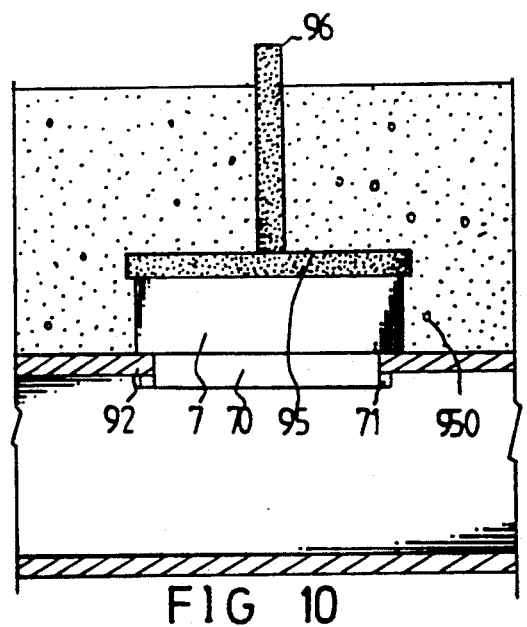
FIG. 10 is a sectional view illustrating the indication of the indicator rod of an indicator plug in concrete floor.
Figure 11:
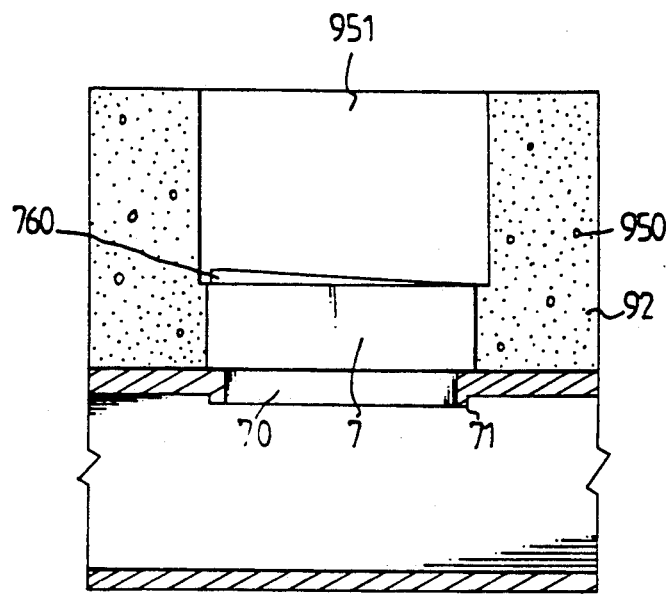
FIG. 11 is a sectional view illustrating that a hole is made on the concrete floor where a wiring plug assembly is located.
Figure 12:
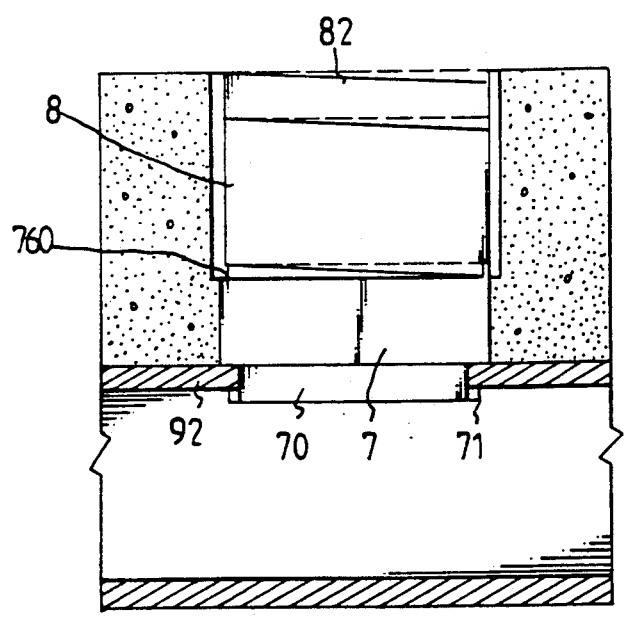
FIG. 12 is as sectional view illustrating the mounting and the horizontal positioning of a wiring plug assembly inside a hole made on the concrete floor.

Referring to FIGS. 9 and 10, during wiring process before concreting, an idicator plug which is comprised of a circular plug portion 95 and an indicator rod portion 96 is mounted on the connector 7 in the ring plate 760. After concreting, the top end of the indicator rod portion 96 is protuding beyond the the top surface of the concrete to indicate the correct position for wiring plug assembly. Referring to FIGS. 11 and 12, during installation of the wiring plug assembly, a tool is used to drill a hole 951 in the concrete 950 at the location where the indicator rod portion 96 of an indicator plug is located. After the indicator plug is removed, the intermediate socket 8, the upper socket 82 and the cap 9 are respectively connected to the ring plate 760 to build the wiring plug assembly. In case the tubular bracket 92 is forced to incline during concreting, the ring plate 760 may be adjusted through an angle from 1-10 degrees to correct the horizontal positioning of the wiring plug assembly.

I claim:

1. A floor electric wire junction case including:

a bottom block comprising four corners, four sector posts respectively arranged at said four corners and a plurality of square posts arranged around a periphery thereof, said sector posts and square posts defining therebetween a plurality of passages, said sector posts and square posts each having a top with a bolt hole therein;

a cover plate mounted on said bottom block comprising round holes respectively matching with said bolt holes of said sector posts and said square posts and secured thereto by first screw bolts tightened into said bolt holes of said bottom block, said cover plate including a plurality of bolt holes arranged above said passages and receiving second screw bolts;

a cap covering on said cover plate;

a plurality of junctions respectively received in said passages and firmly secured therein by said second screw bolts tightened in said bolt holes of said cover plate, said junctions each comprising a collar having a bolt hole and a wiring plug connecting tube held within said collar by a screw tightened in said bolt hole of said collar, said wiring plug connecting tube having a top with a round hole therein;

a plurality of wiring plug assemblies each respectively mounted on said round hole of said wiring plug connecting tube; and a plurality of inserts each comprising a flange at one and thereof, one of said inserts inserted into one of said passages with said flange of said insert stopped at a front wall around sand one passage to completely block said one passage when not used for wiring.

2. The floor electric wire junction case according to claim 1, wherein each of said wiring plug assemblies respectively mounted on said wiring plug connecting tube is comprised of a connector, a ring plate inserted in said connector, an intermediate socket screwed up with said ring plate, an upper socket screwed up with said intermediate socket, and a cap screwed up with said upper socket, said connector having a curved inner wall portion to flexibly support said ring plate permitting flexibel positioning of said ring plate therein.

3. The floor electric wire junction case according to claim 2, wherein said ring plate is a conical ring having a top with narrower diameter and a bottom with a wider diameter for flexible positioning of said ring plate in said inner wall portion of said connector.

4. The floor electric wire junction case according to claim 2, wherein said ring plate comprises an outer wall surface having a notch defining a pair of side edges, and wherein a pin is inserted through a side wall of said connector into said notch of said ring plate so as to abut said two side edges for preventing said ring plate from rotating.

* * * * *